May 12, 1925. Re. 16,068

W. N. SECHLER

ARCH SUPPORT

Original Filed Feb. 5, 1921

Inventor
William N. Sechler
By J. V. Cornwall Atty.

Reissued May 12, 1925. Re. 16,068

UNITED STATES PATENT OFFICE.

WILLIAM N. SECHLER, OF FORT SCOTT, KANSAS.

ARCH SUPPORT.

Original No. 1,391,584, dated September 20, 1921, Serial No. 442,770, filed February 5, 1921. Application for reissue filed April 8, 1922. Serial No. 550,908.

*To all whom it may concern:*

Be it known that I, WILLIAM N. SECHLER, a citizen of the United States, residing at Fort Scott, in the county of Bourbon and State of Kansas, have invented new and useful Improvements in Arch Supports, of which the following is a specification.

This invention relates to arch supports and has for an object the provision of a device intended to be built into a shoe for the prevention of fallen arches and to correct that condition where already present.

Another object is the provision of an arch support which, when built into a shoe will embody all of the advantages of a stiff shank shoe and yet not permit the arch of the foot to become inactive, the construction and function of the device being such as to produce a massaging action upon the foot and thus stimulate and improve blood circulation.

Another object is the provision of an arch support whose construction embodies a hinge capable of only a limited movement in one direction, a locking action being produced so that when the weight of the body is placed upon the foot, the heel will be prevented from running over or backward.

With the above and other objects in view, the invention further includes the following novel features and details of construction, to be hereinafter more fully described, illustrated in the accompanying drawings and pointed out in the appended claims.

In the drawings:—

Figure 1:
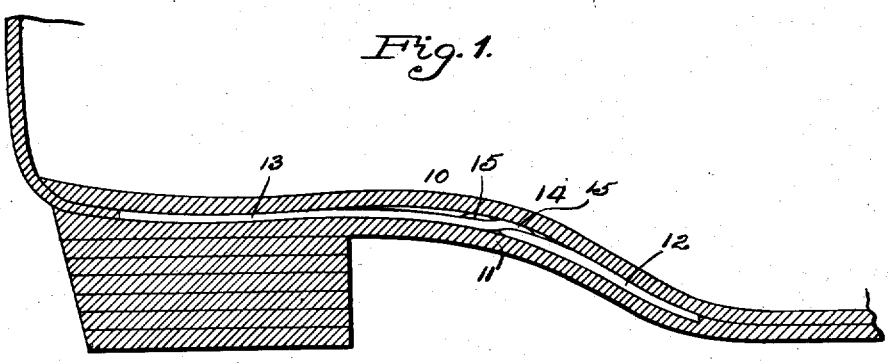
Figure 1 is a longitudinal section through a portion of the shoe showing the support in depressed position.
Figure 2:
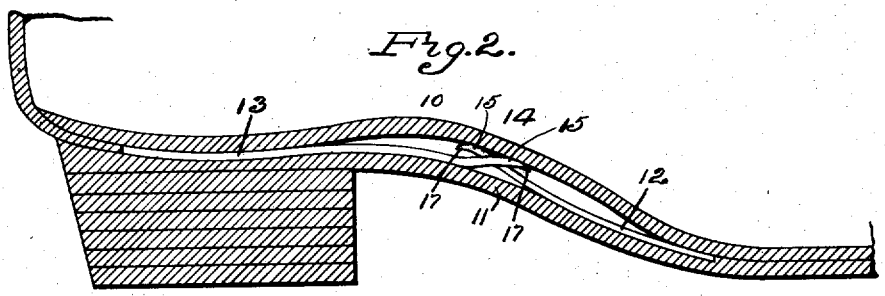
Figure 2 is a similar view illustrating the hinge action of the support.
Figure 3:
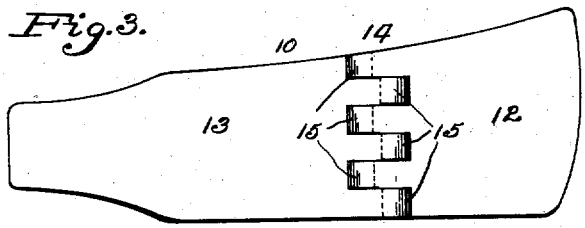
Figure 3 is a plan view of the support removed from the shoe.
Figure 4:
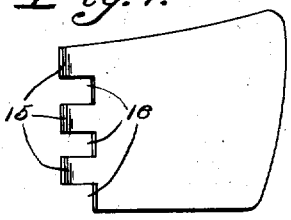
Figure 4 is a detail view of the front section of the support.
Figure 5:
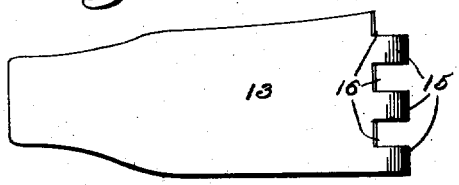
Figure 5 is a similar view of the rear section.

Referring in detail to the drawings, wherein like characters of reference denote corresponding parts, the reference character 10 indicates a support which is adapted to be built into the shank 11 of the shoe. This support includes a front section 12 and a rear section 13, which are connected by a hinge 14 of novel formation. The front section 12 is shaped to fit beneath the ball of the foot, while the rear section 13 connects with the front section beneath the arch of the foot and extends back beneath the heel.

The hinge 14 comprises spaced tongues 15 which extend from the adjacent ends of the front and rear sections 12 and 13, the said tongues 15 of the section being alternately arranged, so that the tongues of one section will be received within spaces 16 provided between the tongues of the other section. The tongues 15 have their extremities downwardly curved as shown at 17, and these downwardly curved extremities of the tongues extend over the adjacent faces of the sections 12 and 13. During the action of walking, the sections are permitted a limited hinged movement and in addition are permitted relative longitudinal movement. This provides an easy yielding movement of the arch portion of the shoe at the end of a step when the ball of the foot is lowered and causes the arch to be raised positively at the beginning of a step when the heel is lifted. Due to the engagement of the curved extension 17 upon the upper faces of the sections 12 and 13 the arch of the foot is held firmly supported after the manner of support afforded by a shoe having a stiff shank. These movements of the arch of the shoe cause a massaging action upon the arch of the foot.

The invention is susceptible of various changes in its form, proportions and minor details of construction and the right is herein reserved to make such changes as properly fall within the scope of the appended claims.

Having described the invention what is claimed is:—

1. An arch support formed of separate sections and spaced tongues extending from the adjacent edges of the sections, the tongues of one section fitting within the spaces between the tongues of the other section and overlying said adjacent edges, to connect the sections in a manner to permit of relative pivotal and longitudinal movement.

2. An arch support formed of separate sections, spaced tongues extending from the adjacent edges of the sections and downwardly curved extremities formed on said tongues, the tongues of one section fitting within the spaces between the tongues of the other section and the downwardly curved extremities of said tongues overlying the said adjacent edges of the sections to connect the latter in a manner to permit of limited relative pivotal and longitudinal movement.

3. An arch support for shoes adapted to be arranged between the inner and outer soles, said support having a rear section adapted to extend over the heel of the shoe and having a relatively movable section at the front end of said rear section capable of being flexed in one direction only from a normal position.

4. An arch support comprising two arch-supporting stiff sections and assembly means therefor, one of said sections being pivotally movable in one direction only, in a vertical plane extending longitudinally of the device, from a normal position in which it forms a substantially stiff continuation of the other section.

5. An arch support composed of a plurality of arch-supporting stiff sections united so as to hinge freely on each other in one direction from a normal position but to stiffly resist hinging in the opposite direction from said position.

6. An arch support adapted to fit into a shoe and comprising front and rear sections and interengaging elements on said sections which limit downward movement of the sections and shoe shank to form a stiff shank stiffener for supporting the arch of the foot, said elements providing a hinge connection between said sections permitting the adjacent ends of the latter and the shank of the shoe to move upwardly from the position in which the stiff shank support is provided.

7. In a shoe arch support, the combination of a flexible sole member, and stiff elements substantially aligned lengthwise of each other and interconnected so as to resist flexing of said sole member in one direction only from a normal position.

8. An arch support for shoes comprising two arch supporting stiff sections, the rear section extending over the heel portion of the shoe and having a hinged connection with the other section which extends forwardly of said rear section, said connection permitting the forward end to move freely in one direction from a predetermined position but limiting its movement in the opposite direction from said position.

9. An arch support comprising two stiff members arranged longitudinally of the foot and having adjacent ends formed with abutting and overlapping elements which permit said members to pivot relative to each other in one direction vertically of the foot from a given position and which maintain said members stiffly against pivotal movement in the opposite direction from said position.

10. In an arch support, two longitudinally aligned stiff sections, one having spaced tongues in the end adjacent the other section and extending over the latter and the latter section having a tongue fitting within the space between the tongues of the first-mentioned section, offset from the plane of its section and extending over the first-mentioned section.

11. In an arch support, two longitudinally aligned stiff sections, one having spaced tongues in the end adjacent the other section and extending over the latter and the latter section having a tongue fitting within the space between the tongues of the first-mentioned section and extending over the first-mentioned section.

12. A shoe arch support comprising two stiff sections and interconnecting elements which permit relative longitudinal movement of the sections and relative pivotal movement in one direction from a normal position and prevent relative pivotal movement in the opposite direction from said position.

In testimony whereof, I hereunto affix my signature this 18th day of March, 1922.

WILLIAM N. SECHLER.